United States Patent
Tatourian et al.

(10) Patent No.: US 10,924,564 B2
(45) Date of Patent: *Feb. 16, 2021

(54) APPARATUS AND METHODS FOR PROVIDING RECOMMENDATIONS BASED ON ENVIRONMENTAL DATA

(71) Applicant: Intel Corporation, Santa Clara, CA (US)

(72) Inventors: Igor Tatourian, Santa Clara, CA (US); Rita H. Wouhaybi, Portland, OR (US); Hong Li, El Dorado Hills, CA (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 15/645,714

(22) Filed: Jul. 10, 2017

(65) Prior Publication Data

US 2017/0310775 A1 Oct. 26, 2017

Related U.S. Application Data

(63) Continuation of application No. 14/317,513, filed on Jun. 27, 2014, now Pat. No. 9,923,980.

(51) Int. Cl.
*H04L 29/08* (2006.01)
*H04W 4/38* (2018.01)
*H04W 4/80* (2018.01)

(52) U.S. Cl.
CPC .............. *H04L 67/22* (2013.01); *H04W 4/38* (2018.02); *H04W 4/80* (2018.02); *H04L 67/025* (2013.01); *H04L 67/306* (2013.01)

(58) Field of Classification Search
CPC ..... H04L 67/22; H04L 67/025; H04L 67/306; H04L 29/08; H04L 67/024; H04W 4/006;
(Continued)

(56) References Cited

U.S. PATENT DOCUMENTS

| 7,340,438 B2* | 3/2008 | Nordman | G06F 21/6254 705/64 |
| 8,606,636 B1* | 12/2013 | Keoshkerian | G06Q 30/0261 705/14.5 |

(Continued)

FOREIGN PATENT DOCUMENTS

| CN | 103345152 A | 10/2013 |
| CN | 103390194 A | 11/2013 |

OTHER PUBLICATIONS

Boulos et al., "Crowdsourcing, citizen sensing and sensor web technologies for public and environmental health surveillance and crisis management: trends, OGC standards and application examples", International Journal of Health Geographics 2011. (Year: 2011).*

(Continued)

*Primary Examiner* — Dave Misir
(74) *Attorney, Agent, or Firm* — Schwabe, Williamson & Wyatt, P.C.

(57) ABSTRACT

Embodiments of apparatus and methods for providing recommendations based on environmental data and associated contextual information are described. In embodiments, an apparatus may include a data collector to receive environmental data and an analysis module to identify a behavioral model of the first user based at least in part on the environmental data associated contextual information of the first user. The apparatus may further include a recommendation module to provide a recommendation to the first user based at least in part on the behavioral model of the first user (Continued)

and/or environmental data for a second user. Other embodiments may be described and/or claimed.

25 Claims, 8 Drawing Sheets

(58) Field of Classification Search
CPC . H04W 4/38; H04W 4/80; G06N 5/02; G06N 5/04; G06F 17/30; G06F 16/24575; G06F 16/90324
USPC .......................................................... 706/46
See application file for complete search history.

(56) References Cited

U.S. PATENT DOCUMENTS

| | | | | | |
|---|---|---|---|---|---|
| 2010/0253509 | A1* | 10/2010 | Fu | .......................... | G16H 40/63 340/539.22 |
| 2012/0143791 | A1* | 6/2012 | Sathish | ................... | H04L 67/22 706/12 |
| 2012/0264446 | A1* | 10/2012 | Xie | ................... | H04M 1/72572 455/456.1 |
| 2012/0289789 | A1* | 11/2012 | Jain | ..................... | A61B 5/0022 703/301 |
| 2013/0103628 | A1* | 4/2013 | Skelton | .............. | G06Q 30/0277 706/46 |
| 2014/0046722 | A1* | 2/2014 | Rosenbloom | .......... | G06Q 10/06 705/7.28 |
| 2014/0100835 | A1* | 4/2014 | Majumdar | ............. | G06Q 10/10 703/11 |
| 2014/0107932 | A1* | 4/2014 | Luna | ..................... | G16H 50/20 702/19 |
| 2014/0281479 | A1* | 9/2014 | Gettings | ................ | G06Q 10/08 713/150 |
| 2015/0088786 | A1* | 3/2015 | Anandhakrishnan | .... | F24F 11/30 706/11 |
| 2015/0133191 | A1* | 5/2015 | Raman | ................ | H04L 12/6418 455/557 |

OTHER PUBLICATIONS

Office Action dated Sep. 26, 2016 for U.S. Appl. No. 14/317,513, 18 pages.
Office Action dated Aug. 4, 2017 for U.S. Appl. No. 14/317,513, 5 pages.
Office Action dated Mar. 8, 2018 for Chinese Patent Application No. 201510277758.4, 16 pages.
Office Action dated Jun. 21, 2019 for Chinese Patent Application No. 201510277758.4, 7 pages.
Office Action dated Nov. 23, 2018 for Chinese Patent Application No. 201510277758.4, 16 pages.

* cited by examiner

Article of manufacture
810

Storage medium
820

Instructions configured to cause an apparatus, in response to execution of the instructions, to practice (aspects of) embodiments of any one of Figs. 3-6
830

Fig. 8

APPARATUS AND METHODS FOR PROVIDING RECOMMENDATIONS BASED ON ENVIRONMENTAL DATA

RELATED APPLICATIONS

This application is a continuation application of U.S. patent application Ser. No. 14/317,513, entitled "APPARATUS AND METHODS FOR PROVIDING RECOMMENDATIONS BASED ON ENVIRONMENTAL DATA," filed Jun. 27, 2014. The Specification of Ser. No. 14/317,513 is hereby fully incorporated by reference.

FIELD OF THE INVENTION

The present disclosure relates generally to the technical field of computing, and more particularly, to apparatuses and methods for providing recommendations based on environmental data.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

A living organism is interdependent with its environment. For example, the living organism may have chemical interactions with its environment based on biophysical factors, e.g., by exchanging mass, energy, or other properties. Pollution in the air, water, and land on Earth will likely harm us. On the other hand, humans' activities may pollute nature and disrupt the dynamic equilibrium of the balance of nature.

Our environment is also at least partially man-made, e.g., the buildings providing shelter for people, the streets leading people from one place to another, or the city hosting a social environment for people to interact with each other and their institutions.

Various environmental parameters may be measured by their respective suitable sensors. A sensor is an instrument to measure a physical property, e.g., an acoustic, chemical, electrical, or optical property of an object in our environment, and convert the measurement to a signal, e.g., an electrical or optical signal, which may be read by an observer or another instrument. Sensors become ubiquitous at least due to their ever-shrinking size. Sensors may be manufactured on a microscopic scale as microsensors, such as by using microelectromechanical systems (MEMS) technology, or on a nano-scale as nanosensors, such as by using nanoelectromechanical systems (NEMS) technology and/or nanotechnology.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates an article of manufacture having programming instructions, incorporating aspects of the present disclosure, in accordance with various embodiments.

DETAILED DESCRIPTION

Figure 1:
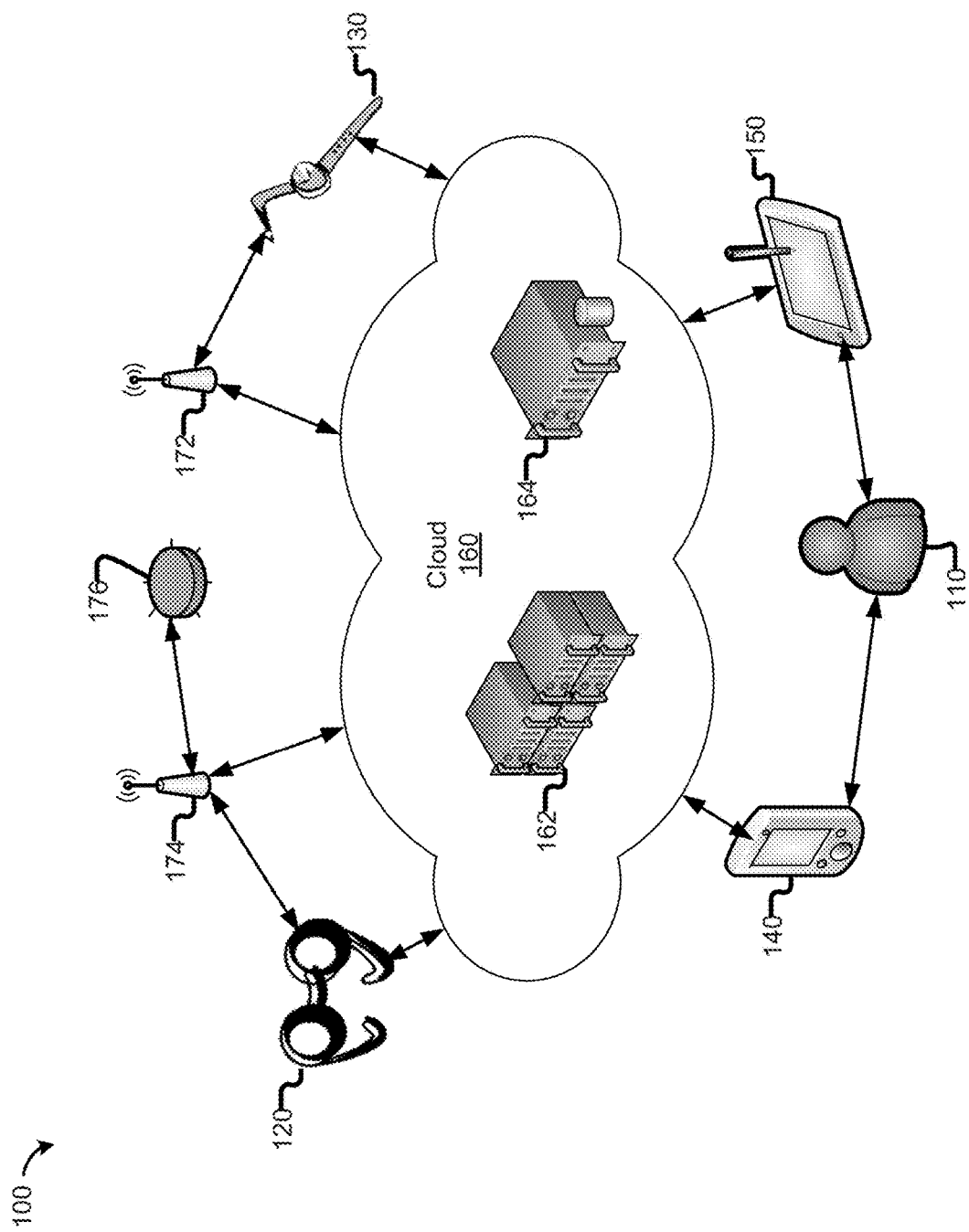
FIG. 1 is a schematic diagram illustrating an example system configuration for providing recommendations based on environmental data, incorporating aspects of the present disclosure, in accordance with various embodiments.

Embodiments of apparatus and methods for providing recommendations based on environmental data are described. In embodiments, an apparatus may include a data collector to receive environmental data for a first user and an analysis module to identify a behavioral model of the first user based at least in part on the environmental data for the first user. The apparatus may further include a recommendation module to provide a recommendation to the first user based at least in part on the behavioral model of the first user and/or environmental data for a second user. Therefore, the apparatus may facilitate collaborative knowledge building based on crowdsourcing of environmental data; furthermore, the apparatus may enable decision making, inference, or discovery based on environmental data. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

In embodiments, for the purposes of the present disclosure, the term "recommendation" means any decision making, inference, or discovery, e.g., based at least in part on environmental data. For the purposes of the present disclosure, the phrase "context" or "contextual information" means any information that can be used to characterize the interaction between a user and a particular environmental setting.

Referring now to FIG. 1, an example system configuration for providing recommendations based on environmental data, in accordance with various embodiments, is illustrated. System 100 may include various sensing devices and various user devices of one or more users, which may respectively have direct or indirect access via networking to service devices. As illustrated in FIG. 1, various sensing devices may include, e.g., sensing devices 172, 174, and 176. User devices may include, e.g., wearable devices 120 and 130, or mobile devices 140 and 150. One or more user devices, including mobile devices 140 and 150, may be accessible to user 110. Mobile or wearable devices may be configured to wirelessly connect to server devices in computing cloud 160 (hereinafter, cloud 160), such as server 162 and data server 164. As will be described in more detail below, sensing devices, user devices, and service devices may be respectively incorporated with corresponding teachings of the present disclosure to enable a user to receive recommendation based at least in part on environmental data. Therefore, system 100 may receive environmental data from not only sensing devices placed in the environment but also user devices of various users. Resultantly, system 100 may provide recommendations to a user based on the collective knowledge from environmental data gathered by various sensing devices and user devices.

In embodiments, as described earlier, user devices in system 100 may include heterogeneous computing devices, such as, but not limited to, wearable devices 120 or 130, and mobile devices 140 or 150, incorporated with the teachings of the present disclosure. Wearable device 120 and/or 130 may be wearable miniature computers, also known as body-borne computers. In embodiments, wearable device 120 and/or 130 may have a device body or form factor with shape, dimension, and materials configured for the device to be worn by a user. As an example, wearable device 120 may have a form factor configured to be worn on a head, such as in the arrangement of eyeglasses. As another example, wearable device 130 may have a form factor configured to be worn on a wrist, such as in the arrangement of watches. In embodiments, wearable device 120 and/or 130 may also be worn by the bearer under, with, or on top of clothing near other parts of a human body, such as the arm, leg, neck, foot, etc.

In embodiments, mobile device 140 may be a portable communication device, such as a smartphone; and mobile device 150 may be a portable computing device, such as a tablet computer. While not illustrated, user devices in system 100 may also include a handheld computer, a laptop, a cellular phone, a pager, an audio and/or video player (e.g., an MP3 player, a DVD player, etc.), a gaming device, a video camera, a digital camera, a navigation device (e.g., a GPS device), a wireless peripheral (e.g., a headset, etc.), and/or other suitable user electronic devices, enhanced with the teachings of the present disclosure.

In embodiments, wearable devices 120 and 130, mobile devices 140 and 150, or other suitable user devices may be equipped with suitable sensors to collect environmental data. The environmental data may include at least one of geographical data, air quality data, water quality data, hazardous waste data, climate data, radiation data, sound data, or semantic data.

In embodiments, environmental data collected by a user device may be locally stored in the user device, such as in wearable devices 120 and 130 or mobile devices 140 and 150. In embodiments, environmental data collected by a user device may be transmitted to and stored in a remote server device, such as server device 162 or 164 in cloud 160. Such environmental data may be processed by a server device in cloud 160 and further be made accessible to a user via a user device, e.g., in response to a user query.

In embodiments, sensing devices 172, 174, or 176 with suitable sensors may capture geographical information, air quality information, water quality information, hazardous waste information, climate information, radiation information, sound information, semantic information, or other environmental information. In addition to collecting data from the outdoor environment, sensing devices may also be able to capture data from urban and indoor environments. In some embodiments, sensing devices may be configured with a general purpose application processor and some storage; in other embodiments, sensing devices, like sensing device 176, may be configured with little to no storage or computational capability, such as those sensors that only spew data for others to collect.

In embodiments, sensors in sensing devices may form a sensor mesh network wherein a sensor may transmit environmental data to another sensor and/or other sensors in the network. In embodiments, sensors may use bidirectional communication to transmit data across the mesh in such a way that each sensor has data from all sensors on the entire network. In embodiments, one or more capable sensing devices may transmit environmental data to cloud 160 based on one or more wired or wireless networks. In embodiments, when a user device is in the vicinity of a sensing device, the user device may pick up the environmental data stored in the sensing device. Later on, when the user device is able to access cloud 160, the environmental data may be uploaded to cloud 160. In embodiments, unmanned amended devices may be deployed to collect environmental data from sensing devices, such as robots or unmanned aerial vehicles, like a drone.

In embodiments, a user device may have a sensor interface configured to communicate with various sensing devices to not only receive or send sensor data but also to manage those sensing devices. As an example, a user device may be configured to selectively actuate a particular type of sensor and command various sensor related operations, such as to start, stop, or pause operations for some sensors, or to adjust sensitivity of other sensors.

In embodiments, sensors in a user device may capture not only the ambient temperature, wind speed, humidity, UV index, odor, chemical composition of the air, or other data of the environment of the user, but also the contextual information or physiological information of a user in that particular environmental setting. As an example, a wearable device may be configured to communicate with an array of sensors, including, but not limited to, timepieces for recording time, positioning devices for recording geographical positions, motion devices for recording velocity and acceleration information, cameras for recording images, audio and/or video recorders for recording sound and/or video, electric pulse recorders for measuring the heart rate, electroencephalography (EEG) devices for recording electrical activity, skin conductance for measuring the electrical conductance of the skin indicating of emotional and sympathetic responses, functional near-infrared spectroscopy (fNIR or fNIRS) devices for the purpose of functional neuroimaging, electronic noses for detecting odors or flavors, etc. Recognizing that the foregoing examples of devices with sensors were merely indicative of potential underlying sensors or technologies, in other embodiments, different sensors or technologies may also be used in a user device. In embodiments, a user device may not only capture the location of the user, traveling path of the user, motion characteristics of the user, but the heart rate of the user, the ambient temperature close to the user, the temperature at different body parts, or other physiological information of the user in a particular environmental setting. Therefore, the user's conscious and subconscious response to a particular environmental setting may be captured as the contextual information for the particular environmental setting.

In embodiments, sensing networks, including various sensing devices and user devices, may provide the infrastructure for crowdsourcing environmental data to cloud 160. Crowdsourcing environmental data may provide better coverage or fusion of data than individual sensors or devices. Crowdsourcing environmental data may provide redundant data, but such redundancy may provide fault tolerance against malfunctioning sensors, e.g., due to technical failures or malicious attacks. In embodiments, a sensing device or a user device may conduct local analysis of environmental data and provide synthesized results or rudimental analysis results to cloud 160 to improve the efficiency of system 100. In embodiments, crowdsourcing environmental data may preserve the privacy of a user due to the fact that similar data may be provided by multiple users.

In embodiments, user devices or sensing devices in system 100 may be configured to communicate with cloud 160, a computing infrastructure complex. Cloud 160 may support cloud computing, which generally refers to an adequately resourced computing model with resources, such as hardware, storage, management solutions, security solutions, business applications, etc., available as services via networking. Cloud 160 may generally offer its services as infrastructure as a service (IaaS), platform as a service (PaaS), software as a service (SaaS), network as a service (NaaS), and communication as a service (CaaS). Moreover, cloud 160 may specifically offer services, based on one or more service types, such as IaaS, PaaS, SaaS, NaaS, or CaaS, supporting a user to obtain recommendations based at least in part on environmental data. Furthermore, such services may be made available on demand and may be delivered economically.

In embodiments, cloud 160 may include one or more server devices, for example, server 162 and/or data server 164, hereinafter, collectively referred to as "recommendation server," incorporated with the teachings of the present disclosure, to cooperatively enable a user to obtain recommendations. In embodiments, server 162 may be application servers, which may perform application related logic relating to analyzing environmental data and providing recommendations accordingly. In embodiments, data server 164 may be configured to provide data services for analyzing environmental data and providing recommendations accordingly, so that environmental data and the knowledge based on the environmental data may be managed, stored, queried, and retrieved from cloud 160.

In embodiments, the recommendation server may be configured to serve multiple user devices associated with a user, as well as multiple users. The recommendation server may be configured to register or associate multiple user devices with a user through, for example, the user's email address, phone number, driver's license number, student identification number, passport number, biological information, or any other suitable credential.

In embodiments, the recommendation server may be configured to interface with any online service, such as online social networks. As an example, users may share their preferences, opinions, reactions, or comments for a particular environmental setting within their social networks. The recommendation server may send an online crawler to gather such user preferences, opinions, reactions, or comments for the particular environmental setting from social networks linked to the user. In some embodiments, a user may register his or her associated social network accounts to the recommendation server. In some embodiments, the recommendation server may analyze various social networks and automatically build up a mapping relationship between a user and the user's online accounts in social networks. As a result, the recommendation server may provide recommendations to a user's friends on his or her social networks based on the user's preferences, opinions, reactions, or comments for the particular environmental setting.

In embodiments, cloud 160 may include one or more wireless and/or wired networks to operatively couple the user devices or sensors to the recommendation server. The networks may include public and/or private networks, such as, but not limited to, the Internet, a telephone network (e.g., public switched telephone network (PSTN)), a local area network (LAN), a wide area network (WAN), a cable network, an Ethernet network, and so forth. In embodiments, user devices may be coupled to these networks via a cellular network and/or a wireless connection. Wireless communication networks may include various combinations of wireless personal area networks (WPANs), wireless local-area networks (WLANs), wireless metropolitan area networks (WMANs), and/or wireless wide area networks (WWANs).

Figure 2:
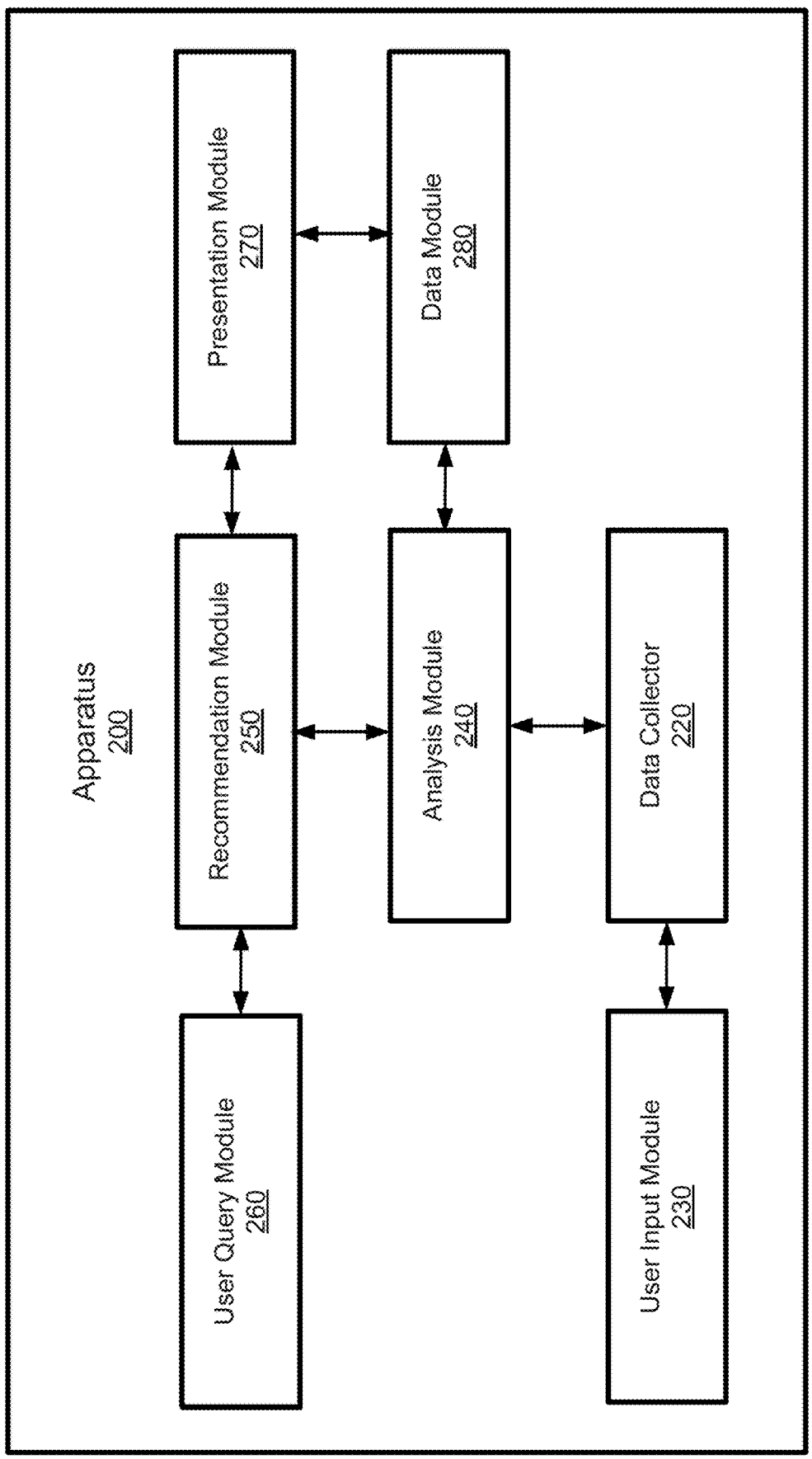
FIG. 2 is a schematic diagram illustrating an example implementation of an apparatus for providing recommendations based on environmental data, incorporating aspects of the present disclosure, in accordance with various embodiments.

Referring now to FIG. 2, an example implementation of an apparatus for providing recommendations based on environmental data, in accordance with various embodiments, is illustrated. In embodiments, apparatus 200 may be a server device, such as server 162 in FIG. 1. In embodiments, apparatus 200 may be a distributed system with various components or subsystems distributed at various mobile or stationary devices. Apparatus 200 may utilize the environmental data and other related information in providing recommendations to a user.

Apparatus 200 may include data collector 220 configured to communicate with various sensing devices and user devices for collecting environmental data and related contextual information. Data collector 220 may utilize one or more wireless or wired networks to communicate with those sensing devices or user devices. Those networks may include public and/or private networks, such as, but not limited to, LANs, WANs, or the Internet. In embodiments, those networks may include cellular networks or wireless networks, like WPANs, WLANs, WMANs, or WWANs.

In embodiments, data collector 220 may receive environmental data from, e.g., sensing device 174 or mobile device 140. User devices, as illustrated in FIG. 1, may collect many types of contextual data related to a particular environmental setting. Such contextual data may include, but not be limited to, location, time, user activity, user mood, user health conditions, etc. In embodiments, data collector 220 may collect and aggregate in-situ contextual data with its associate environmental data, from distributed sources. As an example, information of a particular environmental setting, such as geo, radiation, water quality, temperature, air quality, power lines, noise levels, long-term health status of inhabitants of the area, etc., associated with a user's response, reaction, or comments of that particular environmental setting may be received by data collector 220. With the rise of environmental concerns, environmental data and user inputs may be collected, e.g., by apparatus 200, from many individuals for environmental data aggregation, analysis, sharing, and new applications. In embodiments, analysis module 240 may be configured to tag or mark environmental data with context information, e.g., as the metadata. As an example, environmental data may be tagged with an in-situ user input.

In embodiments, the data collector 220 may be coupled to user input module 230. User input module 230 may be configured to collect user inputs toward a particular environmental setting wherein user inputs may include the user's preferences, opinions, reactions, or comments for the particular environmental setting. In some embodiments, a user may actively provide such user inputs to apparatus 200 via user input module 230, such as providing inputs via a web interface or an app installed on a user device. In some embodiments, user input module 230 may collect such user inputs from various online resources without the active participation of the user, such as by crawling through the user's online postings, e.g., blogs, Facebook® pages, Tweets, etc. In some embodiments, user input module 230 may enable a user to directly upload environmental data to apparatus 200. In some embodiments, user input module 230 may enable a user to modify or otherwise correct environmental data stored in apparatus 200.

In embodiments, analysis module 240 may be configured and used by apparatus 200 to analyze environmental data and/or contextual information of the environmental data. In embodiments, analysis module 240 may build a behavioral model of a user with any suitable behavioral modeling theories and techniques, based on environmental data and associated contextual information. Once the behavioral model of the user is established, the user's future compatible behavior may be predicted. In one embodiment, apparatus 200 may provide recommendations to the user by categorically recognizing compatible behavior of the user.

In building a behavioral model, analysis module 240 may be configured and used for the abstraction, recognition, or understanding of situations/activities/events relating to a particular environmental setting. Moreover, analysis module 240 may use perceptual computing algorithms to determine user states (e.g., relaxed, excited, etc.) to facilitate the abstraction of situations associated with the particular environmental setting. In embodiments, the user state may be determined by a user device based on that user's response to that particular environmental setting, such as a change of pulse, respiratory rate, etc, for indicating whether the user is excited for that particular environmental setting.

In embodiments, analysis module 240 may match and correlate environmental data to the data from user devices, such as wearable and mobile devices on a person, and build the behavioral model accordingly. As an example, one behavioral model may indicate a behavioral pattern for visiting national parks during travel, while the other behavioral model may indicate a different behavioral pattern for visiting pubs during travel. Moreover, the former behavioral model may further indicate the usual environmental setting associated with the behavioral pattern for visiting national parks, such as the weather and the season; similarly, the later behavioral model may further indicate the usual environmental setting associated with the behavioral pattern for visiting pubs, such as the music genres and olfactory parameters measured from those pubs.

In embodiments, analysis module 240 may also utilize environmental data collected from other users in building or modifying the behavioral model of this user. As an example, a device belonging to this user may only be able to measure limited environmental parameters. However, some other devices belonging to other users may simultaneously collect environmental data that cannot be collected by the user's devices. Once all environmental data of a particular location and time are retrieved by data collector 220, analysis module 240 may utilize any necessary information to build the behavioral model for the user regardless of whether such information is collected by that user's devices.

In embodiments, analysis module 240 may refine or rebuild the behavioral model of a user when new environmental data is received by apparatus 200. In embodiments, analysis module 240 may refine or rebuild the behavioral model of the user when a user input is received by apparatus 200, e.g., via user input module 230. In embodiments, analysis module 240 may refine or rebuild the behavioral model of the user upon a request from recommendation module 250.

Analysis module 240 may be coupled to data module 280. In embodiments, data module 280 may be configured to be used by apparatus 200 to manage data, e.g., to store, retrieve, query, and manipulate environmental data. In embodiments, contextual information may be stored together with environmental data. In embodiments, user behavioral models may be stored via data module 280. Data module 280 may be coupled with one or more database management systems (DBMS) which allow the definition, creation, querying, update, and administration of databases. Data module 280 may use any one of the database standards, such as structured query language (SQL), open database connectivity (ODBC), Java database connectivity (JDBC), unstructured databases (NoSQL), or any other database standard to work with more than one database. Data module 280 may be configured to store environmental data locally in apparatus 200 or remotely in a remote device.

Apparatus 200 may include user query module 260 configured to receive and process user queries. In some embodiments, user queries may be generated by anonymous users. In this case, a generic behavioral model may be used to provide generic recommendations. In some embodiments, user queries may be generated by registered users. In this case, a user query may be mapped to a known user behavioral model to enable personalized recommendations. As an example, a user query may direct to sightseeing in a city. If the user is a registered user, this user query will be matched with this user's behavioral model before passing to recommendation module 250.

Recommendation module 250 may provide recommendations to the user in response to the user query or in response to the user's situation. In embodiments, recommendation module 250 may consult with analysis module 240 for one or more suitable behavioral models, which may include one or more behavioral models associated with the user. In embodiments, recommendation module 250 may retrieve relevant environmental data as well as personal data of the user via data module 280. In embodiments, recommendation module 250 may apply machine learning algorithms on those data to create personal recommendations or extract long-term trends. In embodiments, recommendation module 250 may apply data mining algorithms such as association learning, clustering, or classification, on those data to create personal recommendations. In embodiments, recommendation module 250 may use other algorithms and other aspects of the user's behavioral model to provide recommendations. As an example, recommendation module 250 may use one or more behavioral models of this user's friends to provide recommendations to this user.

In embodiments, recommendation module 250 may mobilize any numbers of sensing devices or user devices to dynamically collect environmental data in order to answer a user query. For example, a user may wonder whether she should purchase a house in a particular community. The behavioral model of the user may indicate that this user is sensitive to air pollution. If apparatus 200 lacks suitable air quality data from that particular community, recommendation module 250 may request sensing devices or user devices located in the area within that particular community to collect suitable environmental data on the fly. Therefore, a recommendation based on accurate information may be provided to the user.

A recommendation may be provided to the user by presentation module 270 in various formats. In embodiments, recommendations of points of interest may be highlighted in a 3D map with zooming functions. As an example, a 3D map of a particular region could show places selected for a user based on the user's interest in visiting theaters and museums. As another example, a heat map based on a particular pollutant may be presented to a user, which may be used for guiding the user from choosing a morning jogging route to selecting a house to purchase.

In embodiments, recommendations may be provided to the user based on that user's situation via presentation module 270. As an example, presentation module 270 may deliver augmented reality via a user's glassware, such as displaying points of interest on a trail route based on the behavioral model of the user while the user is riding his mountain bike on the trail. In embodiments, recommendation module 250 and presentation module 270 may be exposed to the development community via application programming interface (API) and software development kit (SDK) to enable developers to create unique user interfaces (UIs) and experiences to provide recommendations to users.

In embodiments, apparatus 200 may provide environmental data to consumers, research institutions, government agencies, or other entities. In the meantime, any receiving entities may provide feedback on what types of information is of greater interest, from whom, etc. back to apparatus 200. This kind of feedback loop may further improve the effectiveness, relevancy, and adaptability of apparatus 200.

In one embodiment, an app, suitable for a user device, like a smartphone, may be configured to enable a user to provide feedback via user input module 230. As an example, the app may be equipped with a "like" button and a rating slider to express a user's feedback about being in a place. While a smartphone or a wearable device is capturing environmental data, the user may have an option to indicate how much he likes or dislikes the place. In this way, when environmental data captured by various sensors is transmitted via the user device, the user may be engaged by this app to rate the place and provide a comment. In other embodiments, user opinions may be implicitly derived based on how far the user went and how long the user stayed at a place, from sensor data, such as data from an accelerometer, a gyroscope, etc., on one or more user devices carried by the user. Subsequently, the environmental data, the rating, the comment, and other information of the user known to the app (e.g., the user's speed or accelerations when going through the environment, presence of other people like family members or friends, etc.) may all be uploaded to apparatus 200 via data collector 220. Further, such ratings or comments may be posted by apparatus 200 to a Twitter® account or to an online feed dedicated to the place.

In embodiments, the behaving model of the user may be dynamically updated, such as based at least in part on the feedback from the user. As an example, apparatus 200 may provide a particular recommendation to the user. The user may later provide feedback to indicate whether the user likes or dislikes the recommendation. The behavioral model of this user may be updated based on the user's feedback, e.g., by analysis module 240. Therefore, apparatus 200 may refine the behavioral model of the user and provide more accurate recommendations to the user.

In embodiments, apparatus 200 may be implemented differently as depicted in FIG. 1. As an example, analysis module 240 may be implemented as an integrated subsystem of recommendation module 250. As another example, user query module 260 may be combined with user input module 230 to form a comprehensive user handling module. In embodiments, components depicted in FIG. 1 may have a direct or indirect connection not shown in FIG. 1. As an example, data module 280 may be directly connected with analysis module 240 as well as data collector 220.

In embodiments, some or all components of apparatus 200 may be spread across any number of different devices or networks. Some or all components of apparatus 200 may be local or remote to the user. As an example, data collector 220 may be distributed to various user devices for its initial data collection tasks. In embodiments, some or all components of apparatus 200 may be, directly or indirectly, in communication with various sensing devices. In embodiments, some or all components of apparatus 200 may be in communication with each other and/or various sensing devices via one or more communication modules (not shown in FIG. 1) with any suitable communication protocols.

Figure 3:
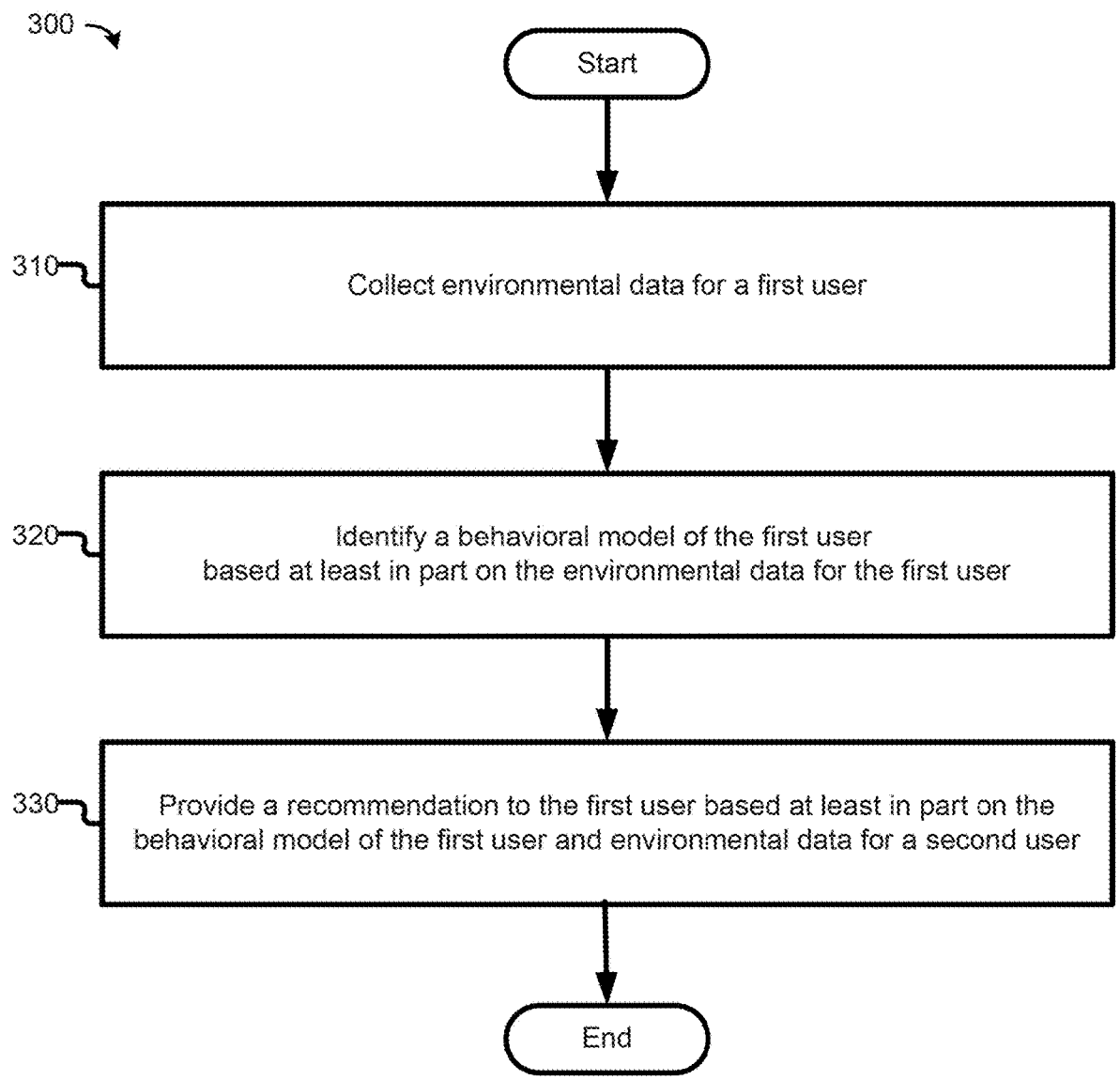
FIG. 3 is a flow diagram of an example process for providing recommendations based on environmental data, which may be practiced by an example apparatus, incorporating aspects of the present disclosure, in accordance with various embodiments.

Referring now to FIG. 3, it is a flow diagram of an example process for providing recommendations based on environmental data which may be practiced by an example apparatus incorporating aspects of the present disclosure, in accordance with various embodiments. The process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to provide recommendations to the user. As such, process 300 may be performed by a computing device, e.g., apparatus 200, to implement one or more embodiments of the present disclosure.

In embodiments, the process may begin at block 310, where environmental data for the first user is collected, e.g., by data collector 220. As discussed in connection with FIG. 1 and FIG. 2, in embodiments, environmental data may be initially gathered by various sensing devices and user devices, then uploaded to apparatus 200 via data collector 220. The environmental data may include at least one of geographical data, air quality data, water quality data, hazardous waste data, climate data, radiation data, sound data, or semantic data related to a particular environmental setting. In some embodiments, data collector 220 may receive the environmental data from a mobile device of the first user. In some embodiments, the environmental data for the first user are in-situ environmental data collected from one or more sensors near the first user.

Next, at block 320, a behavioral model of the first user may be identified based at least in part on the environmental data for the first user, e.g., by analysis module 240. In embodiments, the behavioral model of the first user may be built further based on the contextual information related to the environmental data. In embodiments, the behavioral model of the first user may be further refined based on new environmental data, contextual information, or user feedback.

Next, at block 330, a recommendation to the first user may be provided based at least in part on the behavioral model of the first user and environmental data for a second user, e.g., by recommendation module 250. As previously discussed, recommendation module 250 may understand the compatible behavior based on the user's behavioral model. In embodiments, recommendation module 250 may further learn similarities between this user and another user based on their behavioral models. Therefore, recommendation module 250 may provide recommendations based on a behavioral model of a second user, such as based on similar preferences of the second user, taking into consideration location, age, social status, and other parameters of these users.

Figure 4:
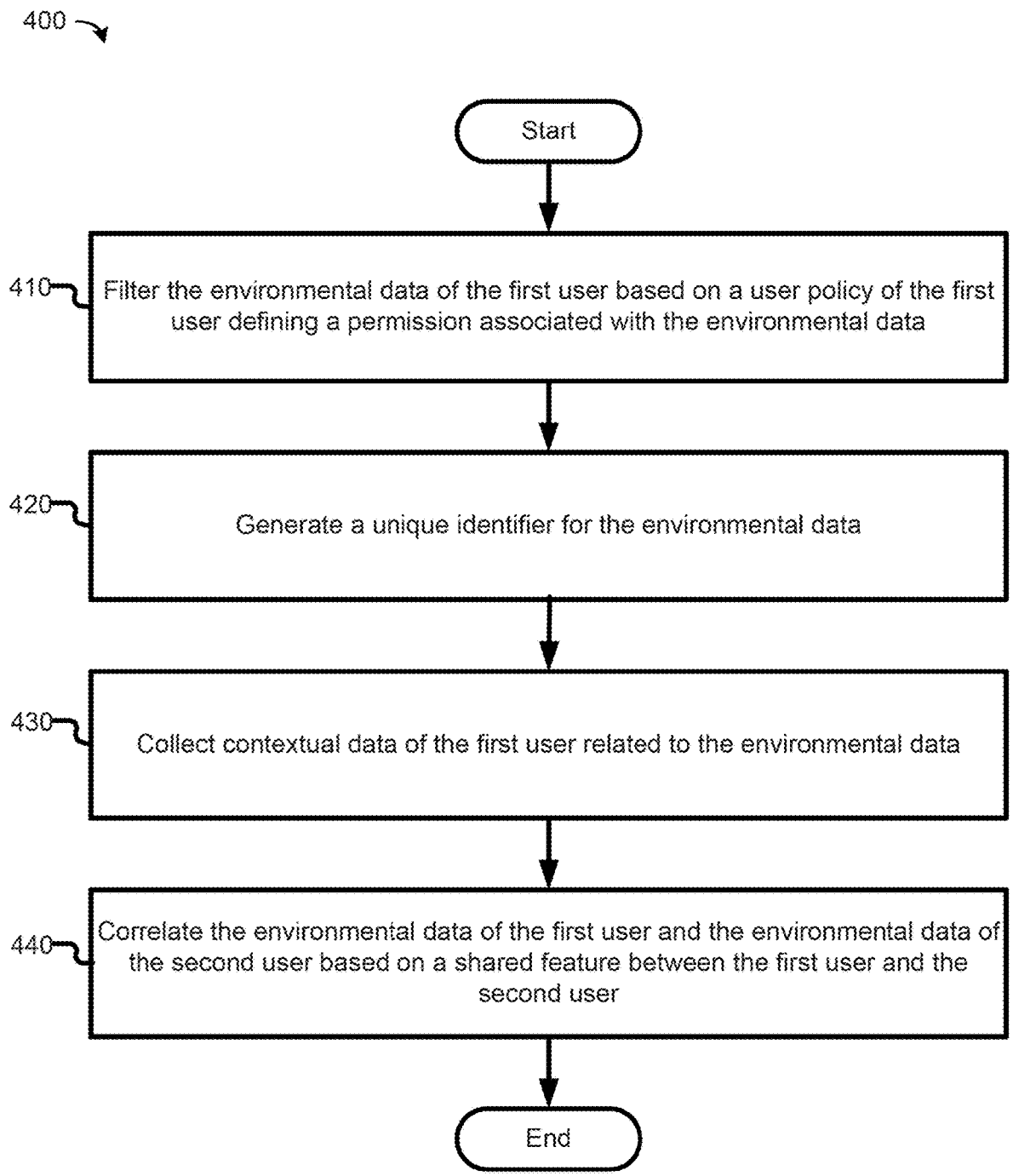
FIG. 4 is a flow diagram of an example process for collecting and analyzing environmental data, which may be practiced by an example apparatus, incorporating aspects of the present disclosure, in accordance with various embodiments.

Referring now to FIG. 4, it is a flow diagram of an example process for collecting and analyzing environmental data, which may be practiced by an example apparatus in accordance with various embodiments. As shown, process 400 may be performed by apparatus 200 to implement one or more embodiments of the present disclosure. In embodiments, process 400 may be performed in reference to block 310 and block 320 in FIG. 3. In embodiments, various blocks in FIG. 4 may be combined or arranged in any suitable order, e.g., according to the particular embodiment of apparatus 200 to collect and analyze environmental data for a user.

In embodiments, the process may begin at block 410, where the environmental data for the first user may be filtered based on a user policy of the first user defining a permission associated with the environmental data, e.g., by data collector 220 or by a user device. As an example, some environmental data, such as those collected from a user's private room, may be filtered out based on the privacy setting of the user. In some embodiments, a user policy may allow environmental data and/or contextual data to be anonymized before uploading to data collector 220.

Next, at block 420, a unique identifier for the environmental data may be generated, e.g., by data collector 220. In some embodiments, data may be stamped with some unique identifier to ensure that only one copy of the data is recorded in apparatus 200 because same environmental data could be transmitted from multiple sensing devices or user devices, e.g., for fault tolerance purpose. In other embodiments, where data storage and processing time are less concerned, multiple sets of data, each with a unique identifier, may be saved even for data recorded for the same place in the same time but from different devices.

In embodiments, data collected from a user (e.g., heart rate, etc., of the user) may be tagged with the user's unique identifier to identify and differentiate those user related data. In embodiments, data collected for a user may also be encrypted with any suitable cryptographic algorithms to protect the data. As an example, the user's unique identifier may be used in a seeded hash of the sensor data or used to sign the sensor data as a key. In embodiments, data collected from or for a user may be anonymized to protect the privacy of the user. In embodiments, the response or action taken by apparatus 200 for environmental data or contextual information related to a user may be configured by the user.

Next, at block 430, contextual data of the first user related to the environmental data may be collected, e.g., by data collector 220 or user input module 230. In embodiments, the contextual data of the first user related to the environmental data may include at least one of a user activity, a user reaction, a user health parameter, a user physiological parameter, or a user psychological parameter. In embodiments, the contextual data may be collected simultaneously with the environmental data. As discussed before, the contextual data may be collected from an input of the user in a social network.

Next, at block 440, the environmental data for the first user may be correlated with the environmental data for the second user based on a shared feature between the first user and the second user, e.g., by analysis module 240 or recommendation module 250. In embodiments, the environmental data for the first user and the environmental data for the second user may be related in space or time. As an example, the environmental data collected by two different users from the same location but different times may be related. In embodiments, the environmental data for the first user and the environmental data for the second user may be related based on a shared feature between the first user and the second user. As an example, environmental data from different peoples in the same household may be related. In embodiments, a recommendation to the first user may be partially based on the behavioral model of the second user. As an example, a recommendation to a person may be partially based on the behavioral model of his or her spouse as it is likely they may share some behavioral patterns and tendencies.

Figure 5:
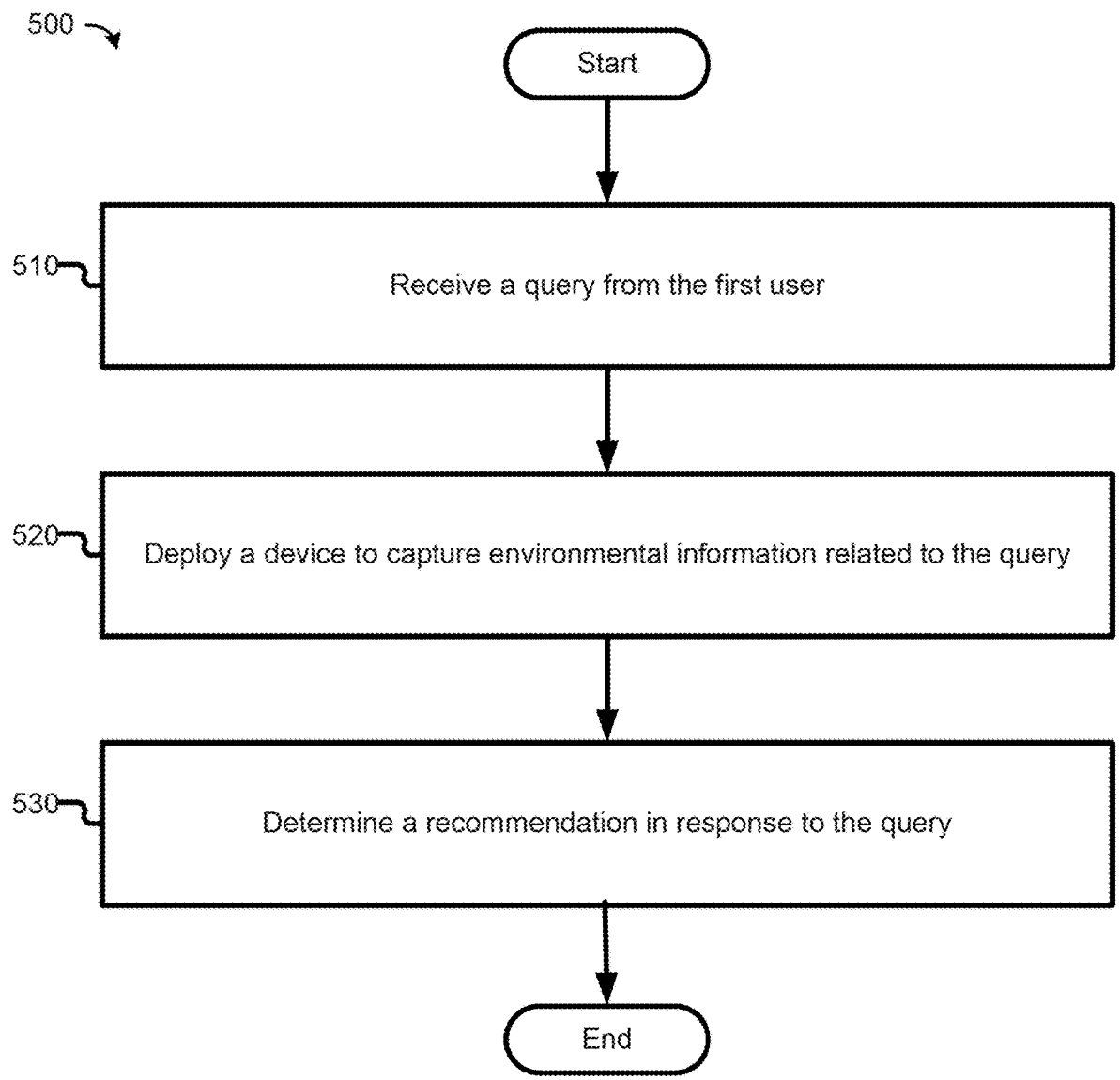
FIG. 5 is a flow diagram of an example process for responding to a user query, which may be practiced by an example apparatus, incorporating aspects of the present disclosure, in accordance with various embodiments.

Referring now to FIG. 5, it is a flow diagram of an example process for responding to a user query, which may be practiced by an example apparatus in accordance with various embodiments. As shown, process 500 may be performed by apparatus 200 to implement one or more embodiments of the present disclosure. In embodiments, process 500 may be performed in reference to block 330 in FIG. 3. In embodiments, various blocks in FIG. 5 may be combined or arranged in any suitable order, e.g., according to the particular embodiment of apparatus 200 to handle user queries.

In embodiments, the process may begin at block 510, where a query may be received from the first user, e.g., by user query module 260. In some embodiments, the identity of the first user may be unknown. In this case, a generic behavioral model may be used to provide generic recommendations. In some embodiments, the query may be generated by a registered user. In this case, the user query may be mapped to this known user's behavioral model to generate personalized recommendations.

Next, at block 520, a device may be deployed to capture environmental information related to the query, e.g., by the data collector 220 or recommendation module 250. In some embodiments, there are insufficient environmental data to provide a complete response to the query. Therefore, one or more suitable sensing devices or user devices may be deployed to gather additional environmental data necessary for responding to the query. As an example, a user may attempt to swim in Lake Washington in Seattle, but may have concerns about the water temperature at his local swimming site. If the recommendation server, in connection with FIG. 1, lacks contemporary data regarding the water temperature at that particular swimming site, a sensing device or a user device situated in that swimming site, like from a bystander or a swimmer there, may be deployed to retrieve necessary environment data in response to the query.

Next, at block 530, a recommendation in response to the query may be determined, e.g., by recommendation module 250. In embodiments, recommendation module 250 may determine the recommendation based on the behavioral model associated with the user. In embodiments, recommendation module 250 may retrieve relevant environmental data, contextual information, and personal data of the user in determining the recommendation. In embodiments, recommendation module 250 may apply machine learning algorithms or data mining algorithms to create recommendations. In embodiments, recommendation module 250 may use other algorithms and other aspects of the user's behavioral model to provide recommendations.

Figure 6:
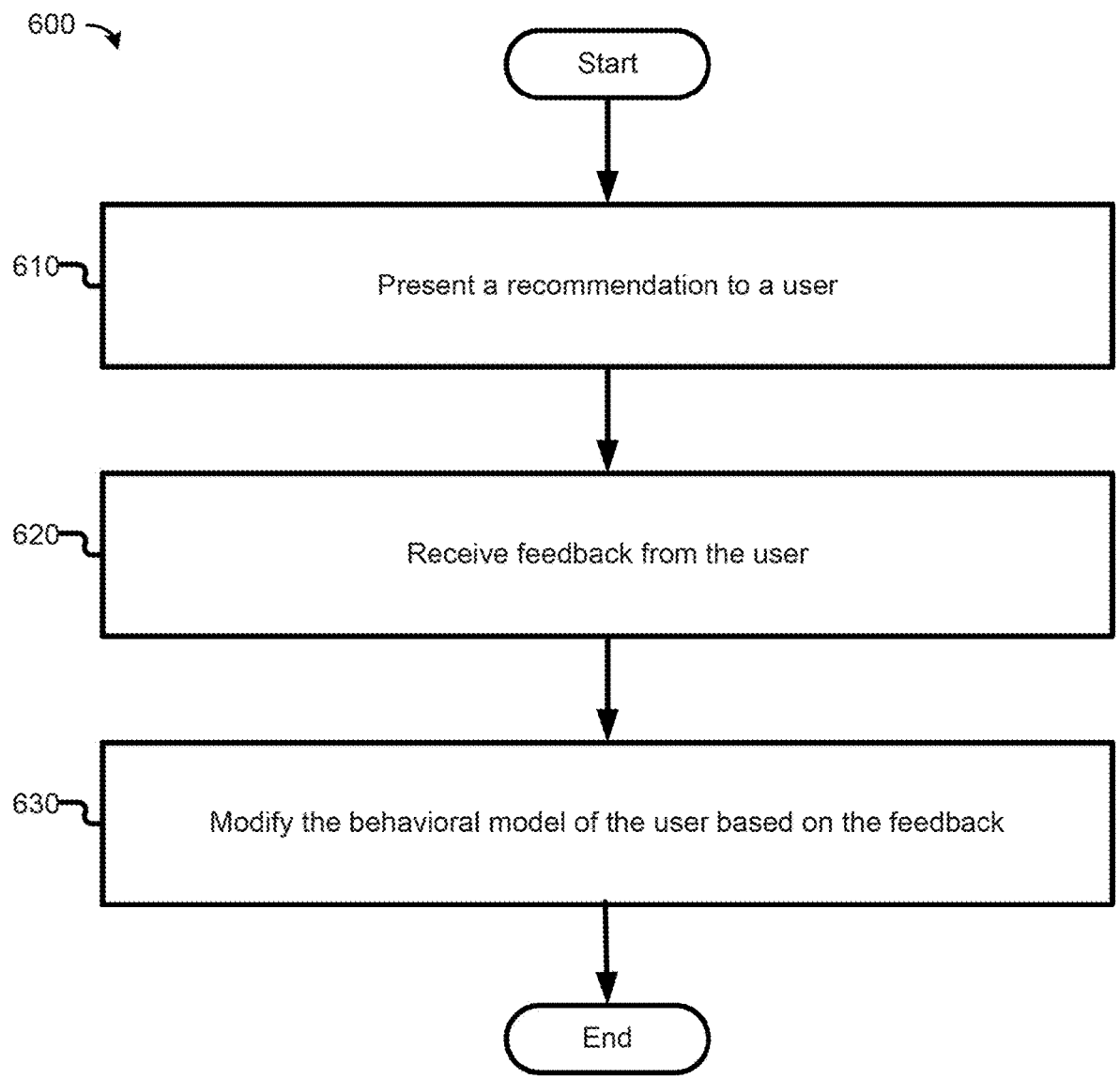
FIG. 6 is a flow diagram of an example process for modifying the behavioral model of a user, which may be practiced by an example apparatus, incorporating aspects of the present disclosure, in accordance with various embodiments.

Referring now to FIG. 6, it is a flow diagram of an example process for modifying the behavioral model of a user, which may be practiced by an example apparatus in accordance with various embodiments. As shown, process 600 may be performed by apparatus 200 to implement one or more embodiments of the present disclosure. In embodiments, process 600 may be performed in reference to block 320 in FIG. 3. In embodiments, various blocks in FIG. 6 may be combined or arranged in any suitable order, e.g., according to the particular embodiment of apparatus 200 to modify the behavioral model of the user.

In embodiments, the process may begin at block 610, where a recommendation may be presented to a user, e.g., by presentation module 270. In embodiments, the recommendation may be presented in various formats, such as in text, visual presentation, or multimedia presentation. In embodiments, the recommendation may be presented in tactile format, such as through haptics, e.g., by applying forces, vibrations, or motions to the user.

Next, at block 620, feedback may be received from the user, e.g., by user input module 230. In embodiments, the user may provide feedback to recommendation module 250 based on the recommendation. As an example, the user may express his or her opinion about the recommendation, such as liking or disliking the recommendation, or providing a user rating of the recommendation. In embodiments, the feedback may be implicit based on the user's situation. As an example, a user may be involved in a car accident, and this event may be provided to the recommendation server as implicit feedback.

Next, at block 630, the behavioral model of the user may be modified based on the feedback, e.g., by analysis module 240. In embodiments, the behavioral model of the user may be refined based on the feedback. A user's behavior may change over time, sometimes voluntary, sometimes involuntary such as due to some events. As an example, sports car racing may be a known compatible activity of a user, but it may become an incompatible activity after the user has just had a serious automobile accident. As another example, bungee jumping may be a known compatible activity of a user, but it may become an incompatible activity of the user during her pregnancy. In these examples, the user may explicitly provide feedback in response to receiving recommendations for otherwise fitting the user's known compatible activities. Accordingly, the recommendation server may refine the user's behavioral model based on the feedback. In other embodiments, the recommendation server may utilize contextual information, such as those significant events, as implicit feedback to refine the user's behavioral model without any explicit feedback from the user.

Figure 7:
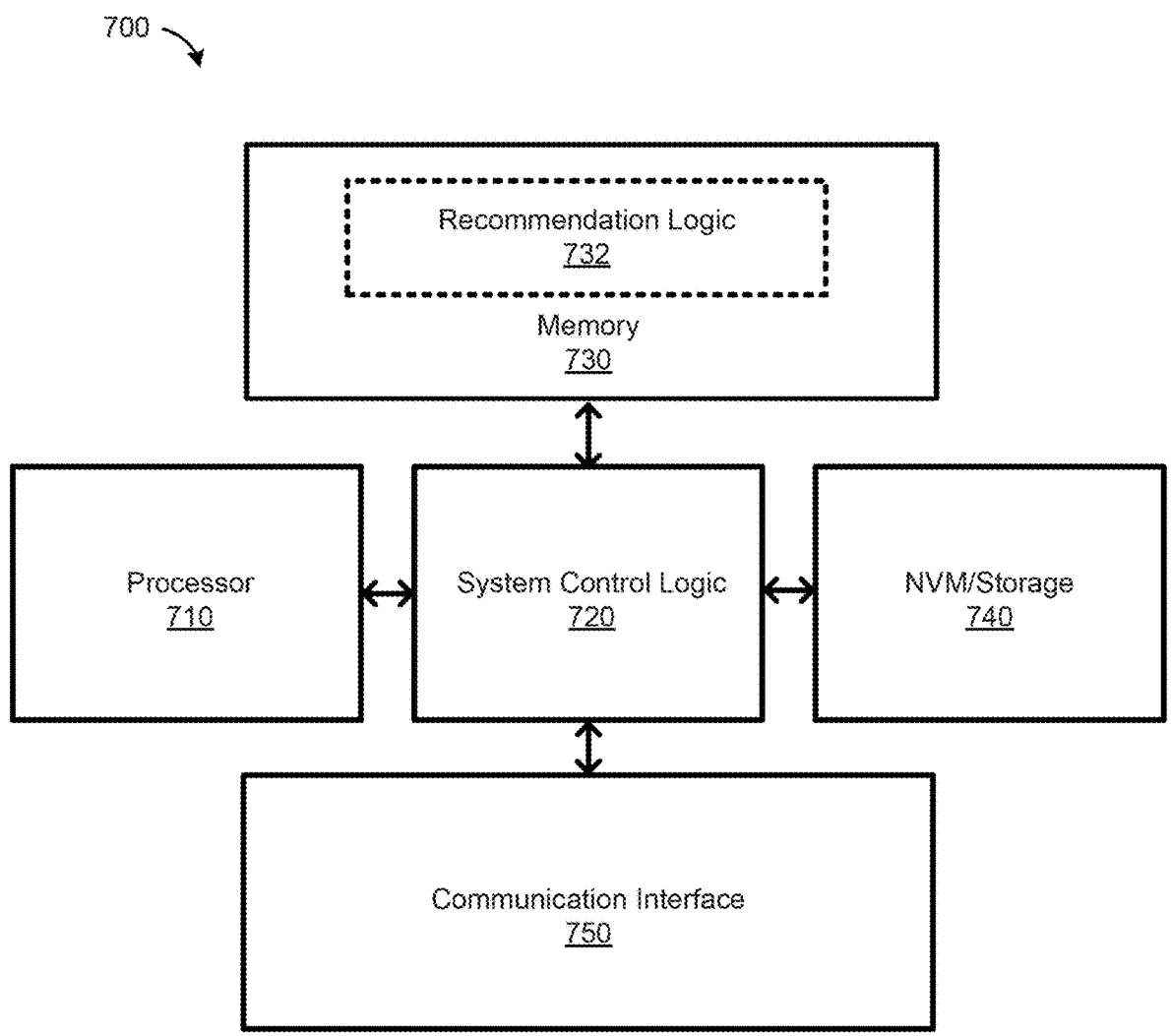
FIG. 7 illustrates an example computing device suitable for practicing the disclosed embodiments, in accordance with various embodiments.

FIG. 7 illustrates an embodiment of a computing device 700 suitable for practicing embodiments of the present disclosure. Computing device 700 may be any computing device that is within a user's reach (e.g., a device which the user carries, wears, touches, gestures, etc.), in forms such as a smart phone, a tablet, a laptop, a wearable, a server, etc. As illustrated, computing device 700 may include system control logic 720 coupled to processor 710, to system memory 730, to non-volatile memory (NVM)/storage 740, and to communication interface 750. In various embodiments, processor 710 may include one or more processor cores.

In embodiments, communication interface 750 may provide an interface for computing device 700 to communicate with the variety of sensors as previously discussed in connection with FIG. 1. In embodiments, communication interface 750 may provide an interface for computing device 700 to communicate over one or more network(s) and/or with any other suitable device. Communication interface 750 may include any suitable hardware and/or firmware, such as a network adapter, one or more antennas, wireless interface(s), and so forth. In various embodiments, communication interface 750 may include an interface for computing device 700 to use near field communication (NFC), optical communications, or other similar technologies to communicate directly (e.g., without an intermediary) with another device, including sensors. In various embodiments, communication interface 750 may interoperate with radio communications technologies such as, for example, Wideband Code Division Multiple Access (WCDMA), Global System for Mobile Communications (GSM), Long Term Evolution (LTE), Bluetooth®, Zigbee, and the like.

In some embodiments, system control logic 720 may include any suitable interface controllers to provide for any suitable interface to the processor 710 and/or to any suitable device or component in communication with system control logic 720. System control logic 720 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 720 may include one or more memory controller(s) (not shown) to provide an interface to system memory 730. System memory 730 may be used to load and store data and/or instructions, for example, for computing device 700. System memory 730 may include any suitable volatile memory, such as dynamic random access memory (DRAM), for example.

In some embodiments, system control logic 720 may include one or more input/output (I/O) controller(s) (not shown) to provide an interface to NVM/storage 740 and communication interface 750. NVM/storage 740 may be used to store data and/or instructions, for example. NVM/storage 740 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 740 may include a storage resource that is physically part of a device on which computing device 700 is installed or it may be accessible by, but not necessarily a part of, computing device 700. For example, NVM/storage 740 may be accessed by computing device 700 over a network via communication interface 750.

In embodiments, system memory 730, NVM/storage 740, and system control logic 720 may include, in particular, temporal and persistent copies of recommendation logic 732. Recommendation logic 732 may include instructions that, when executed by processor 710, result in computing device 700 providing recommendations based on environmental data, such as, but not limited to, processes 300, 400, 500, and 600. In embodiments, recommendation logic 732 may include instructions that, when executed by processor 710, result in computing device 700 performing various functions associated with data collector 220, user input module 230, analysis module 240, recommendation module 250, user query module 260, and presentation module 270, in connection with FIG. 2.

In some embodiments, processor 710 may be packaged together with system control logic 720 and/or recommendation logic 732. In some embodiments, at least one of the processor(s) 710 may be packaged together with system control logic 720 and/or recommendation logic 732 to form a System in Package (SiP). In some embodiments, processor 710 may be integrated on the same die with system control logic 720 and/or recommendation logic 732. In some embodiments, processor 710 may be integrated on the same die with system control logic 720 and/or recommendation logic 732 to form a System on Chip (SoC).

Depending on which modules of apparatus 200 in connection with FIG. 2 are hosted by computing device 700, the capabilities and/or performance characteristics of processor 710, system memory 730, and so forth, may vary. In various implementations, computing device 700 may be a smartphone, a tablet, a mobile computing device, a wearable computing device, a server, etc., enhanced with the teachings of the present disclosure.

FIG. 8 illustrates an article of manufacture 810 having programming instructions, incorporating aspects of the present disclosure, in accordance with various embodiments. In various embodiments, an article of manufacture may be employed to implement various embodiments of the present disclosure. As shown, the article of manufacture 810 may include a computer-readable non-transitory storage medium 820 where instructions 830 are configured to practice embodiments of or aspects of embodiments of any one of the processes described herein. The storage medium 820 may represent a broad range of persistent storage media known in the art, including but not limited to flash memory, dynamic random access memory, static random access memory, an optical disk, a magnetic disk, etc. Instructions 830 may enable an apparatus, in response to their execution by the apparatus, to perform various operations described herein. For example, storage medium 820 may include instructions 830 configured to cause an apparatus, e.g., apparatus 200, to practice some or all aspects of providing recommendations based on environmental data, as illustrated in process 300 of FIG. 3, process 400 of FIG. 4, process 500 of FIG. 5, or process 600 of FIG. 6, in accordance with embodiments of the present disclosure. In embodiments, computer-readable storage medium 820 may include one or more computer-readable non-transitory storage media. In other embodiments, computer-readable storage medium 820 may be transitory, such as signals, encoded with instructions 830.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. For example, as noted earlier, while for ease of understanding the disclosure hereinabove primarily described an apparatus with a metal band on the side to demonstrate various embodiments, this disclosure may also be embodied in an apparatus without a metal band on the side. Therefore, it is manifestly intended that embodiments described herein be limited only by the claims.

The following paragraphs describe examples of various embodiments.

Example 1 is an apparatus for providing recommendations, which may include a data collector to receive environmental data for a first user; an analysis engine, coupled to the data collector, to identify a behavioral model of the first user based at least in part on the environmental data for the first user; and a recommendation engine, coupled to the analysis engine, to provide a recommendation to the first user based at least in part on the behavioral model of the first user and environmental data for a second user.

Example 2 may include the subject matter of Example 1, and may further specify that the environmental data comprises at least one of geographical data, air quality data, water quality data, hazardous waste data, climate data, radiation data, sound data, or semantic data.

Example 3 may include the subject matter of Example 1 or 2, and may further specify the data collector is to receive the environmental data from a mobile device of the first user.

Example 4 may include any subject matter of Examples 1-3, and may further specify that the data collector is to further collect contextual data of the first user related to the environmental data.

Example 5 may include the subject matter of Example 4, and may further specify that the contextual data comprises at least one of a user activity, a user reaction, a user heath parameter, a user physiological parameter, or a user psychological parameter.

Example 6 may include the subject matter of Example 4 or 5, and may further specify that the data collector is to collect the contextual data simultaneously with the environmental data.

Example 7 may include any subject matter of Examples 4-6, and may further specify that the data collector collects the contextual data from an input of the first user in a social network.

Example 8 may include any subject matter of Examples 1-7, and may further specify that the recommendation engine is to relate the environmental data for the first user and the environmental data for the second user in space or time.

Example 9 may include any subject matter of Examples 1-8, and may further specify that the recommendation engine is to relate the environmental data for the first user and the environmental data for the second user based on a shared feature between the first user and the second user.

Example 10 may include any subject matter of Examples 1-9, and may further specify that the recommendation engine is to make the recommendation based on a behavioral model of the second user.

Example 11 may include any subject matter of Examples 1-10, and may further specify that the recommendation engine is to present a plurality of points of interest in the recommendation in a three-dimensional map or a heat map to the first user.

Example 12 is a method for providing recommendations, which may include collecting, by a computing device, environmental data for a first user; identifying, by the computing system, a behavioral model of the first user based at least in part on the environmental data for the first user; and providing, by the computing system, a recommendation to the first user based at least in part on the behavioral model of the first user and environmental data for a second user.

Example 13 may include the subject matter of Example 12, and may further include generating, by the computing system, a unique identifier to the environmental data.

Example 14 may include the subject matter of Example 12 or 13, and may further include collecting, by the computing system, contextual data of the first user related to the environmental data.

Example 15 may include the subject matter of Example 14, and may further specify that the environmental data for the first user are in-situ environmental data collected from a plurality of sensors near the first user.

Example 16 may include any subject matter of Examples 12-15, and may further include filtering, by the computing system, the environmental data for the first user based on a user policy of the first user defining a permission associated with the environmental data.

Example 17 may include any subject matter of Examples 12-16, and may further include correlating, by the computing system, the environmental data for the first user and the environmental data for the second user based on a shared feature between the first user and the second user.

Example 18 may include the subject matter of Example 17, and may further specify that the environmental data for the first user and the environmental data for the second user are correlated in space or time.

Example 19 may include any subject matter of Examples 12-18, and may further specify that providing a recommendation comprises providing a recommendation based on a behavioral model of the second user.

Example 20 may include any subject matter of Examples 12-19, and may further include receiving, by the computing system, a query from the first user; requesting a device to capture environmental information related to the query; and determining, by the computing system, a response to the query.

Example 21 may include the subject matter of Example 20, and may further include anonymizing, by the computing system, the captured environmental information.

Example 22 may include any subject matter of Examples 12-21, and may further include receiving, by the computing system, a feedback from the first user based on the recommendation; and modifying, by the computing system, the behavioral model of the first user based on the feedback.

Example 23 may include any subject matter of Examples 12-21, and may further include presenting, by the computing system, a plurality of points of interest in the recommendation in a three-dimensional map or a heat map.

Example 24 is at least one storage medium, which may include a plurality of instructions configured to cause an apparatus, in response to execution of the instructions by the apparatus, to practice any subject matter of Examples 12-23.

Example 25 is an apparatus for providing recommendations, which may include means for collecting environmental data for a first user; means for identifying a behavioral model of the first user based at least in part on the environmental data for the first user; and means for providing a recommendation to the user based at least in part on the behavioral model of the user and environmental data for a second user.

Example 26 may include the subject matter of Example 25, and may further include means for correlating the environmental data for the first user and the environmental data for the second user.

Example 27 may include the subject matter of Example 25, and may further specify that the means for providing a recommendation comprises means for providing a recommendation based on a behavioral model of the second user.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A network of sensors, comprising:
   first one or more sensors included in first one or more sensor devices to collect first physical environmental data of a first plurality of environmental parameters of an environment surrounding a first user; and
   second one or more sensors included in second one or more sensor devices to collect second physical environmental data of a second plurality of environmental parameters of the environment, the first and second plurality of environmental parameters being different environmental parameters;
   wherein at least selected ones of the first and second one or more sensors formed a mesh network;
   wherein the first and second one or more sensors forward the first and second physical environmental data to a remote server, through first one or more user devices of the first user;
   wherein the first one or more user devices further collect and forward contextual data of the first user reflective of interactions of the first user with the environment, to the remote server;
   wherein the remote server, in addition to the first and second physical environmental data, further receives third physical environmental data of the environment from second one or more user devices of a second user; and wherein the remote server forms a physical behavioral model of the first user, based at least in part on the third physical environmental data, and at least one of the first or second physical environmental data, and the contextual data of the first user, formulates a recommendation for the first user using the physical behavioral model of the first user, and sends the recommendation to a user device of the first user.

2. The network of sensors of claim 1, wherein at least one of the first and second one or more sensors that are part of the mesh network forwards the first or the second physical environmental data it collects to another one of first and second one or more sensors that are part of the mesh network to store.

3. The network of sensors of claim 2, wherein the other one of the first and second one or more sensors that are part of the mesh network storing the first or the second physical environmental data sent by the collecting one of first and second one or more sensors that are part of the mesh network, sends the first or the second physical environmental data stored to at least one of the first one or more user devices of the first user.

4. The network of sensors of claim 1, wherein at least one of the first or second one or more sensor devices receives one or more commands from at least one of the first one or more user devices to control collection of the first or second physical environmental data or forwarding of the collected first or second physical environmental data.

5. The network of sensors of claim 1, wherein the remote server, in addition to the first, the second and the third physical environmental data, further receives fourth physical environmental data of the environment from at least one of the first one or more user devices of the first user.

6. The network of sensors of claim 1, wherein the first or the second physical environmental data comprises at least one of geographical data, air quality data, water quality data, hazardous waste data, climate data, radiation data, sound data, or semantic data.

7. The network of sensors of claim 1, wherein the contextual data comprises at least one of an activity of the first user, a reaction of the first user, a health parameter of the first user, a physiological parameter of the first user, or a psychological parameter of the first user.

8. The network of sensors of claim 1, wherein the recommendation is further based on a shared feature between the first user and the second user.

9. The network of sensors of claim 1, wherein the recommendation comprises a three-dimensional map or a heat map having a plurality of points of interest or a plurality of candidate routes.

10. The network of sensors of claim 1, wherein at least one of the first or the second one or more user devices is a wearable device or a mobile device of the first or the second user.

11. The network of sensors of claim 1, wherein the user device of the first user being sent the recommendation by the remote server is one of the first one or more user devices of the first user forwarding the first and second physical environmental data collected by the first and second one or more sensors, to the remote server.

12. A method, comprising:

collecting, with first one or more sensors included in first one or more sensor devices, first physical environmental data of a first plurality of environmental parameters of an environment surrounding a first user;

collecting, with second one or more sensors included in second one or more sensor devices, second physical environmental data of a second plurality of environmental parameters of the environment, the first and second plurality of environmental parameters being different parameters, and at least selected ones of the first and second one or more sensors formed a mesh network; and forwarding, by the first and second one or more sensors, the first and second physical environmental data to a remote server, through first one or more user devices of the first user;

wherein the first one or more user devices further collect and forward contextual data of the first user reflective of interactions of the first user with the environment, to the remote server;

wherein the remote server, in addition to the first and second physical environmental data, further receives third physical environmental data of the environment from second one or more user devices of a second user; and wherein the remote server forms a physical behavioral model of the first user, based at least in part on the first, second and third physical environmental data, and the contextual data of the first user, formulates a recommendation for the first user using the physical behavioral model of the first user, and sends the recommendation to a user device of the first user.

13. The method of claim 12, wherein forwarding comprises at least one of the first and second one or more sensors that are part of the mesh network forwarding the first or the second physical environmental data it collects to another one of first and second one or more sensors that are part of the mesh network to store.

14. The method of claim 13, wherein forwarding comprises the other one of the first and second one or more sensors that are part of the mesh network storing the first or the second physical environmental data sent by the collecting one of first and second one or more sensors that are part of the mesh network, sending the first or the second physical environmental data stored to at least one of the first one or more user devices of the first user.

15. The method of claim 12, further comprising receiving, by at least one of the first or second one or more sensor devices, one or more commands from at least one of the first one or more user devices to control collection of the first or second physical environmental data or forwarding of the collected first or second physical environmental data.

16. The method of claim 12, wherein the remote server, in addition to the first, the second and the third physical environmental data, further receives fourth physical environmental data of the environment from at least one of the first one or more user devices of the first user.

17. The method of claim 12, wherein the first or the second physical environmental data comprises at least one of geographical data, air quality data, water quality data, hazardous waste data, climate data, radiation data, sound data, or semantic data.

18. The method of claim 12, wherein the contextual data comprises at least one of an activity of the first user, a reaction of the first user, a health parameter of the first user, a physiological parameter of the first user, or a psychological parameter of the first user.

19. The method of claim 12, wherein the recommendation is further based on a shared feature between the first user and the second user.

20. The method of claim 12, wherein the recommendation comprises a three-dimensional map or a heat map having a plurality of points of interest or a plurality of candidate routes.

21. The method of claim 12, wherein at least one of the first or the second one or more user devices is a wearable device or a mobile device of the first or the second user.

22. The method of claim 12, wherein the user device of the first user being sent the recommendation by the remote server is one of the first one or more user devices of the first user forwarding the first and second physical environmental data collected by the first and second one or more sensors, to the remote server.

23. At least one non-transitory computer-readable medium (CRM) comprising a plurality of instructions to cause a computing device, in response to execution of the instructions by a processor of the computing device, to:
  receive from a first user device of a first user, first physical environmental data of a first environmental parameter of an environment surrounding the first user, collected by a first sensor included in a first sensor device, and second physical environmental data of a second environmental parameter of the environment collected by a second sensor included in a second sensor device, the first and second environmental parameters being different environmental parameters, and the first and second sensors forming a mesh network, wherein the first and second sensors forward the first and second physical environmental data to the computing device, through the first user device of the first user;
  receive from the first user device of a first user, contextual data of the first user reflective of interactions of the first user with the environment, collected by the first user device of the first user;
  receive third physical environmental data of the environment from a second user device of a second user;
  form a physical behavioral model of the first user, based at least in part on the third physical environmental data, and at least one of the first or second physical environmental data, and the contextual data of the first user;
  formulate a recommendation for the first user, using the physical behavioral model; and
  send the recommendations to the first user device of the first user.

24. The CRM of claim 23, wherein the first or the second physical environmental data comprises first and second temperature data, and the recommendation is temperature related.

25. The CRM of claim 23, wherein to receive from the first and second user devices comprises to receive from first and second mobile phones of the first and the second user.

* * * * *